US009446311B2

(12) United States Patent
Barte et al.

(10) Patent No.: US 9,446,311 B2
(45) Date of Patent: Sep. 20, 2016

(54) DEVICE, GAME AND CONTROL METHODS THEREFOR

(71) Applicant: KING.COM LIMITED, St. Julians (MT)

(72) Inventors: Johannes Barte, Malmo (SE); Calle Stodberg, Malmo (SE); Robin Brook, Malmo (SE); Sebastien Bellanger, Malmo (SE)

(73) Assignee: KING.COM LTD., St. Julians (MT)

( * ) Notice: Subject to any disclaimer, the term of this patent is extended or adjusted under 35 U.S.C. 154(b) by 18 days.

(21) Appl. No.: 14/254,278

(22) Filed: Apr. 16, 2014

(65) Prior Publication Data

US 2015/0298005 A1 Oct. 22, 2015

(51) Int. Cl.
*G07F 17/32* (2006.01)
*A63F 13/537* (2014.01)

(52) U.S. Cl.
CPC .................... *A63F 13/537* (2014.09)

(58) Field of Classification Search
CPC .................. A63F 13/10; A63F 13/04
See application file for complete search history.

(56) References Cited

U.S. PATENT DOCUMENTS 7,828,660 B2 * 11/2010 Kando .............. A63F 13/10
463/37
8,128,476 B1 * 3/2012 Sidhu .............. A63F 3/00643
463/10

OTHER PUBLICATIONS

YouTube, Lucky Lantern Screenshot, p. 1 of 1, Apr. 30, 2014.*

* cited by examiner

*Primary Examiner* — Omkar Deodhar
(74) *Attorney, Agent, or Firm* — Saul Ewing LLP

(57) ABSTRACT

In an embodiment there is provided a method of controlling a user interface responsive to user input with a displayed game board comprising a plurality of object positions on said interface, the method comprising the following implemented by at least one processor of a device in communication with said interface and at least one memory: displaying a game board having a plurality of first and second game objects displayed on said game board positions, each first and second object having one or more characteristics stored in said at least one memory, the second game objects having a third characteristic, detecting an input trajectory comprising a selection of a sequence of one or more neighbouring first game objects sharing at least one same characteristic in response to user input, determining a target direction comprising a portion of said input trajectory with respect to the game board, and generating a further game object having a movement vector comprising said target direction in dependence on said portion of said input trajectory, the target direction extending to the boundary of the displayed game board.

18 Claims, 14 Drawing Sheets

DEVICE, GAME AND CONTROL METHODS THEREFOR

FIELD OF THE INVENTION

Some embodiments may relate to controlling a user interface responsive to user engagement with displayed game objects on the interface of a computer device.

Some embodiments may relate to computer devices having a user interface for engaging users or players in a computer game executable in an online environment.

BACKGROUND OF THE INVENTION

There are many technical challenges and technical considerations facing the designer of computer games executed on user or computer devices having a user interface, such as designing a controllable user interface in the context of available computer devices and resources, which may be limited.

Another technical challenge can involve enabling a game to be fun, accessible and compelling even when there are limited display resources available, such as when a game is being played on a smartphone, tablet or other small or portable computer. Another significant challenge is that of user engagement. Engagement involves designing gameplay to be engaging and rewarding to players. This typically requires games to be easily understood at their simplest or introductory levels, providing rewarding gameplay with simple to complex game mechanics, and becoming progressively more challenging so that players are not bored, but remain engaged and develop rewarding skills.

Effective engagement may also require various forms of feedback based on the game mechanics so that successful utilisation by the user reinforces the user's sense of success and accomplishment.

There are therefore many technical challenges when designing computer implemented games, particularly in providing a challenge to a user or player that is engaging and rewarding so as to provoke repeat play. This may, but not exclusively apply to "casual games".

SUMMARY OF THE INVENTION

According to an aspect, there is provided a method of controlling a user interface responsive to user input with a displayed game board comprising a plurality of object positions on said interface, the method comprising the following implemented by at least one processor of a device in communication with said interface and at least one memory: displaying a game board having a plurality of first and second game objects displayed on said game board positions, each first and second object having one or more characteristics stored in said at least one memory, the second game objects having a third characteristic, detecting an input trajectory comprising a selection of a sequence of one or more neighbouring first game objects sharing at least one same characteristic in response to user input, determining a target direction comprising a portion of said input trajectory with respect to the game board, and generating a further game object having a movement vector comprising said target direction in dependence on said portion of said input trajectory, the target direction extending to a boundary of the displayed game board.

The user input may comprise touch and move input, for example selection of a first game object and subsequent selection of a sequence of one or more neighbouring first game objects sharing at least one same characteristic.

The one or more characteristic of the first and second game objects may comprise attributes defining a displayed colour.

The one or more characteristics of the first and second game objects may comprise a graphical representation of an object type.

The one or more first and second game objects may be disposed on said game board or area displayed to the user.

The selection of the sequence may comprise five or more neighbouring first game objects sharing at least one same characteristic.

The selection of the sequence may comprise six or more neighbouring first game objects sharing at least one same characteristic.

In an embodiment, the input trajectory may comprise touch input in relation to said game board and object positions, and the portion of said input trajectory comprises at least the last two objects selected in the sequence.

In another embodiment, the input trajectory may comprise touch input in relation to said game board and object positions, and the portion of said input trajectory may be dependent upon the positions of the last two objects selected in the sequence.

The target direction may be determined on at least the relation of each of the last two neighbouring objects' positions selected in said sequence with respect to the game board.

The generation of the further game object may comprise providing said movement vector of said further game object with the determined target direction.

In an embodiment, subsequent to the generation of said further object, the further object may be displaced on said game board in accordance with the movement vector.

The displacement of said further game object may comprise removing said first game objects from object positions on said game board coinciding with said movement vector of said further object.

The third characteristic of said second game object may comprise a first state and a second state.

The second game object may be displayed in said first state until activated, after which the second game object is displayed in said second state.

The activation of said second game object may comprise the user input selecting three or more neighbouring first game objects sharing at least one same characteristic, provided at least one of the selected first game objects is adjacent to or neighbouring the second game object.

The displacement of said further game object may comprise removing said second game objects in said second state from object positions on said game board coinciding with said movement vector of said further object.

In another embodiment, the displacement of said further game object may comprise detecting second game object positions on said game board coinciding with said movement vector of said further object, and configuring said second game objects in said first state to said second state based on said movement vector coinciding with said second object positions.

The user input may comprise touch and move input, for example selection and subsequent movement of a selected game object, so as to switch the position of the selected game object with that of a neighbouring or adjacent game object.

The characteristics of the game objects may comprise the game objects being coloured, and may further comprise that game objects be distinguished or matched to other game objects by being coloured differently or sharing the same colour.

The one or more game object characteristics may comprise attributes defining a displayed colour.

The one or more game object characteristics may comprise object type.

The object type may comprise a graphical representation of a lantern.

The at least one of the one or more characteristics shared by said further game object may comprise attributes defining a displayed colour of said lantern.

The at least one of the one or more characteristics shared by said further game object may comprise object type.

The further game object's type may comprise a graphical representation of a dragon.

According to another aspect there is provided a device having a user interface comprising a display for displaying a game board comprising a plurality of object positions on said interface, the interface capable of receiving user input, the user interface displaying on said game board at said plurality of object positions a plurality of first and second game objects displayed on said game board positions, each first and second object having one or more characteristics stored in at least one memory, the second game objects having a third stored characteristic, and at least one processor configured to: detect an input trajectory from said user input comprising a selection of a sequence of one or more neighbouring first game objects sharing at least one same characteristic in response to said user input, determine a target direction comprising a portion of said input trajectory with respect to the game board, and generate a further game object having a movement vector comprising said target direction in dependence on said portion of said input trajectory, the target direction extending to a boundary of the displayed game board.

In an embodiment, the detected input selection sequence may comprise five or more neighbouring first game objects sharing at least one same characteristic.

In another embodiment, the detected input selection sequence may comprise six or more neighbouring first game objects sharing at least one same characteristic.

In an embodiment the input trajectory may comprise a successive input sequence in relation to said game board and neighbouring object positions, and the portion of said input trajectory may comprise at least the last two neighbouring objects selected in the sequence.

In another embodiment, the at least one processor may determine the target direction at least in part on the relation of each of the last two neighbouring objects positions selected in the input sequence with respect to the game board stored in said memory.

In yet another embodiment the at least one processor may generate the further game object for display, and associate the movement vector of said further game object with the determined target direction.

In another embodiment the at least one processor, subsequent to the generation of said further object, may displace said further game object displayed by said display on said game board in accordance with the movement vector.

In an embodiment, the at least one memory may store one or more characteristics of first game objects and second game objects, and a third characteristic associated with the second game objects for generation and display of said first or second game objects on said game board by said processor.

Optionally, the stored third characteristic associated with the second game objects may comprise collision behaviour having at least two states, with a first collision invoking the second game object to transform to said second state, and a second collision invoking the second game object in said second state to be removed or eliminated.

According to another aspect, there is provided a program comprising program code instructions that, when executed by at least one processor, causes said processor to perform the following steps: display a game board having a plurality of first and second game objects displayed on said game board positions, each first and second object having one or more characteristics stored in said at least one memory, the second game objects having a third characteristic, detect an input trajectory comprising a selection of a sequence of one or more neighbouring first game objects sharing at least one same characteristic in response to user input, determine a target direction comprising a portion of said input trajectory with respect to the game board, and generate a further game object having a movement vector comprising said target direction in dependence on said portion of said input trajectory, the target direction extending to a boundary of the displayed game board.

According to yet another aspect, there is provided a computer readable storage device storing instructions that, when executed by a processor, causes said processor to perform the following steps: display a game board having a plurality of first and second game objects displayed on said game board positions, each first and second object having one or more characteristics stored in said at least one memory, the second game objects having a third characteristic, detect an input trajectory comprising a selection of a sequence of one or more neighbouring first game objects sharing at least one same characteristic in response to user input, determine a target direction comprising a portion of said input trajectory with respect to the game board, and generate a further game object having a movement vector comprising said target direction in dependence on said portion of said input trajectory, the target direction extending to a boundary of the displayed game board.

According to another aspect there is provided a device comprising user interface means comprising display means for displaying a game board comprising a plurality of object positions the interface means having user input means for receiving user input, the user interface means displaying on said displayed game board at said plurality of object positions a plurality of first and second game objects, each first and second object having one or more characteristics stored in at least one memory means, the second game objects having a third stored characteristic stored in said at least one memory means, and at least one processing means configured to detect an input trajectory from said user input means comprising a selection of a sequence of one or more neighbouring first game objects sharing at least one same characteristic, determine a target direction comprising a portion of said input trajectory with respect to the game board, and generate a further game object having a movement vector comprising said target direction in dependence on said portion of said input trajectory, the target direction extending to a boundary of the displayed game board.

The user interface means may comprise display means.

The user interface means may comprise the input means.

The input means may comprise touch control means.

The touch control means may comprise capacitive, resistive or gesture detecting means.

The means for storing said characteristics may further store one or more predefined patterns or shape configuration characteristics of the first, second and further game objects.

The processing means may control said display means to eliminate or remove said first or second game objects from the displayed game board in response to received user input of said input means, the elimination or removal of first and second game objects being based on said movement vector of said further game object.

BRIEF DESCRIPTION OF DRAWINGS

To understand some embodiments, reference will now be made by way of example only to the accompanying drawings, in which.

DETAILED DESCRIPTION OF THE INVENTION

The techniques described herein can be implemented in for instance a computer implemented game which involves switching and clicking, or touch and move input to match and thereby eliminate or remove objects.

The terms user and player are used interchangeably throughout this document and no specific meaning is intended using one or the other unless the context suggests otherwise. A person skilled in the art will realise that the different approaches to implementing the game are not exhaustive, what is described herein are certain preferred embodiments. It is possible to implement the invention in a number of variations without departing from its spirit or scope.

Figure 1:
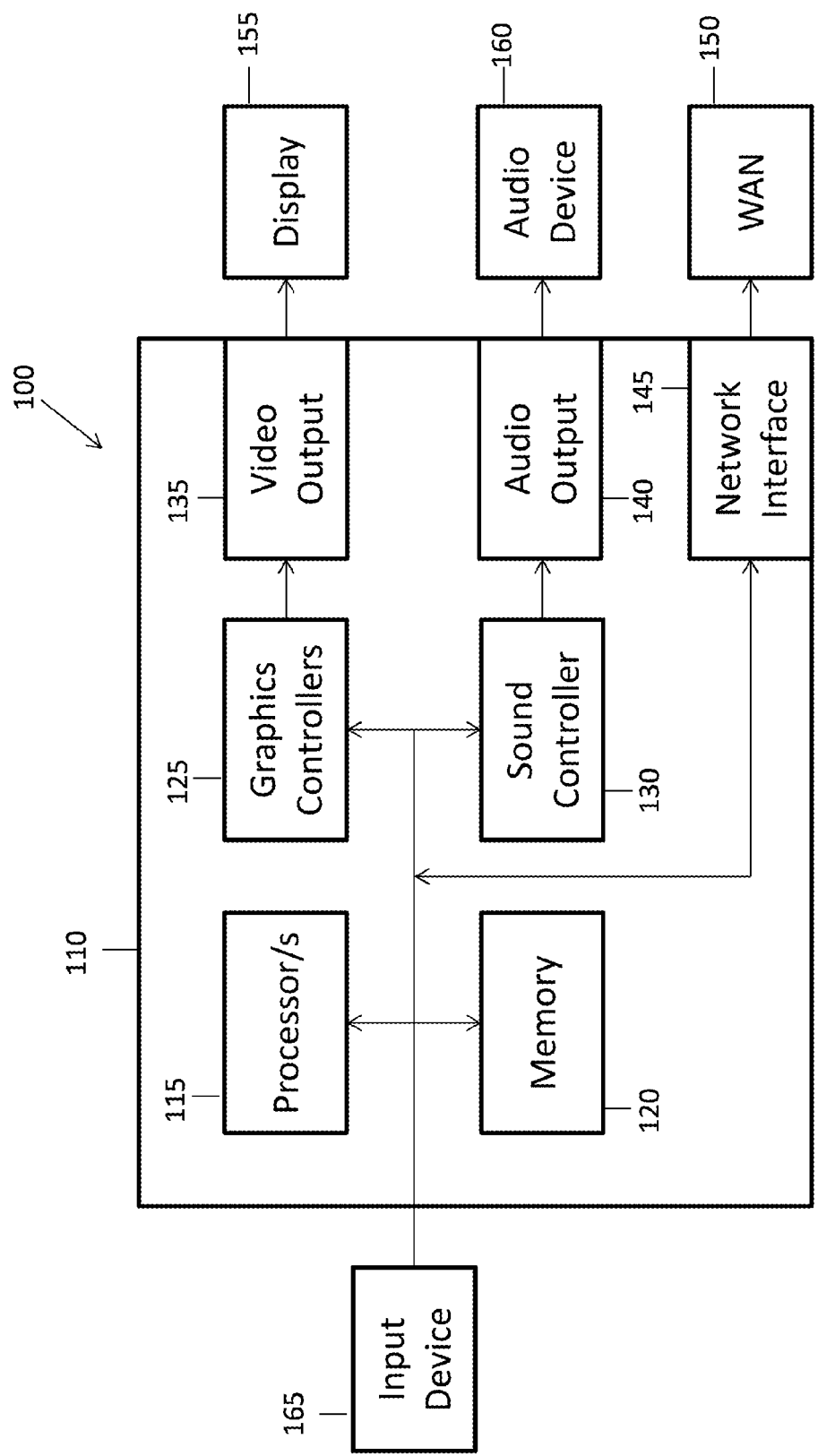
FIG. 1 shows an example user device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that either or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
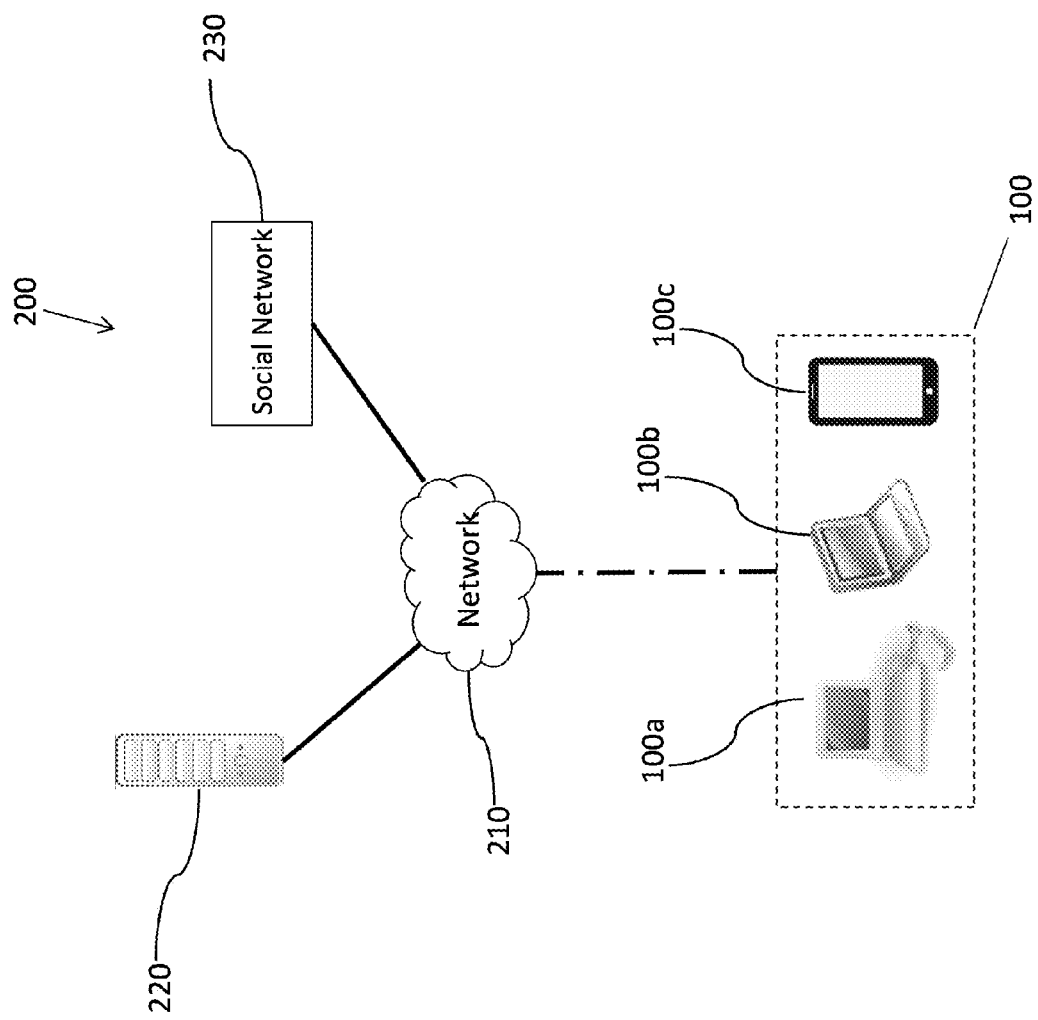
FIG. 2 shows an example system in which some embodiments may be provided.

FIG. 2 schematically shows a system 200 in some embodiments. The system 200 comprises a server 220 which may store databases of game player's details, profiles, statistics, etc. In practice, one or more databases may be provided. Where more than one server is provided, the database(s) may be provided in one database or across two or more servers. The server may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230 such as facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

In some embodiments, the game may be implemented as a computer program that is stored in a memory of the system, for example the server 220, and which runs on a processor of the game server. Data streams or updates are supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet.

Figure 3:
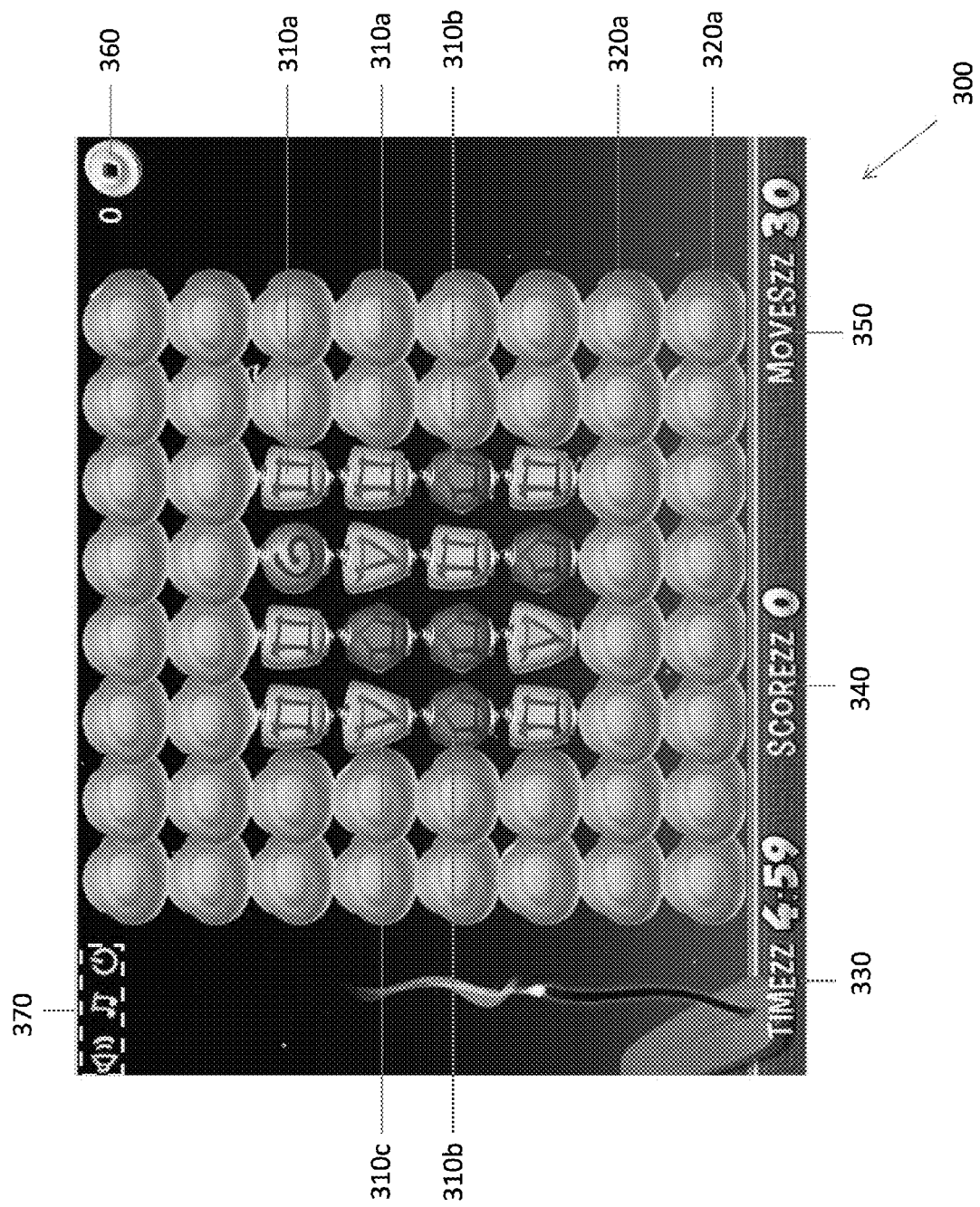
FIG. 3 shows an example game board or area according to some embodiments.

An embodiment will now be described with reference to FIGS. 1, 2 and 3. FIG. 3 illustrates an example displayed 155 game area or game board 300. The game has a game board 300 upon which are disposed first game objects 310*a*, 310*b*, 310*c* which may have varying characteristics. Also disposed on the game board 300 are a number of second game objects 320*a*. The characteristics shared by the first and second game objects may be one or more of colour, shape, and/or different types of objects. In this embodiment, the first game objects are differently coloured and shaped lanterns as shown in FIG. 3. There may also be provided a player selection indicator (not shown in the figure) which may be a representation of a pointer or hand in some embodiments, and may or may not be displayed to a user in some embodiments utilizing intuitive touchscreen or gesture recognition hardware.

Of importance is that a selection mechanism is available for selecting a plurality of game objects, for example "clicking" and/or "switching", or for example a "touch and/or move" or slide mechanism for repositioning displayed first game objects 310*a*, 310*b*, 310*c*. The exact mechanism may be according to the computing or user device resources provided as described in FIGS. 1 and 2.

The game board 300 of FIG. 3 also shows, in this embodiment, an area comprising game information in the form of time elapsed 330, current score 340 and the number of remaining moves 350 available to the user. In addition basic user device controls 370 may be displayed as shown, and special or valuable objects 360 may be counted and displayed, depending on the rules of the computer implemented game.

First game objects 310*a*, 310*b*, 310*c*, 310*d* may be removed from the game board 300 by selecting neighbouring game objects 310*b* that share at least one same characteristic (e.g. colour, and/or type of object graphically represented) of the one or more characteristics. New first game objects may then be generated and displayed in the positions on the game board 300 vacated by those game objects 310*b* that have been removed or eliminated by said selections. The game objects 310*a*, 310*d* replacing those eliminated or removed game objects, may be displayed on the game board 300 and may subsequently cascade position by position in a vertical direction with respect to the game board to occupy those positions made available by the elimination of the first or second game objects.

Figure 4:
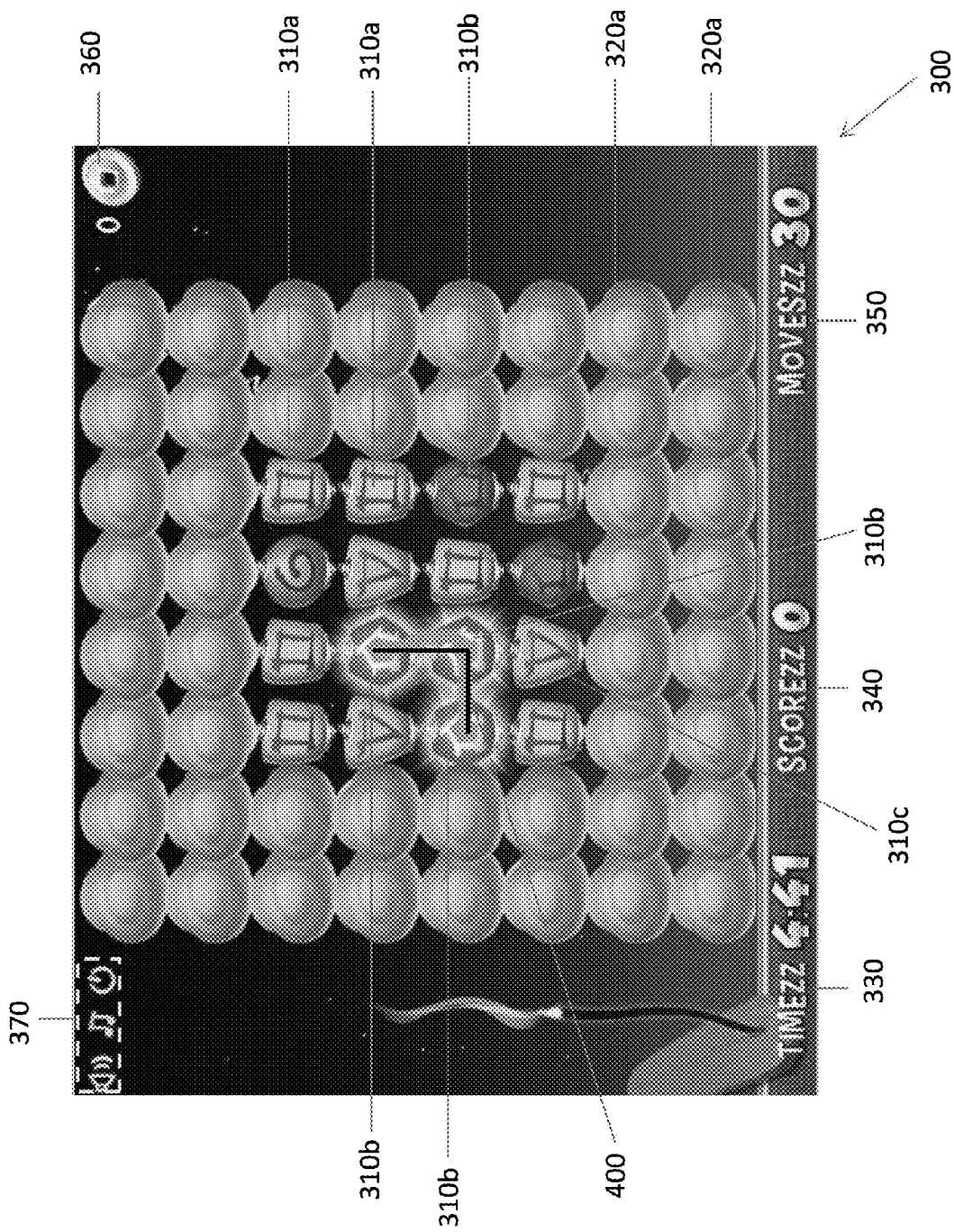
FIG. 4 illustrates the selection of three game objects according to some embodiments.

FIG. 4 illustrates such a mechanic in more detail. FIG. 4 shows a user selection of three neighbouring first game objects 310*b* sharing at least one same characteristic to remove or eliminate the three game objects 310*b* from the game board 300. The shared one or more characteristics of the three game objects 310*b* may in some embodiments be the colour of the first game objects 310*b* selected from for example a palette of four or more colour characteristics. In an embodiment, the four or more colours are for example red, green, blue and yellow.

The game board 300 illustrates the touch or select input track 400 input by the user to highlight and select the group of three first game objects 310*b*.

Figure 5:
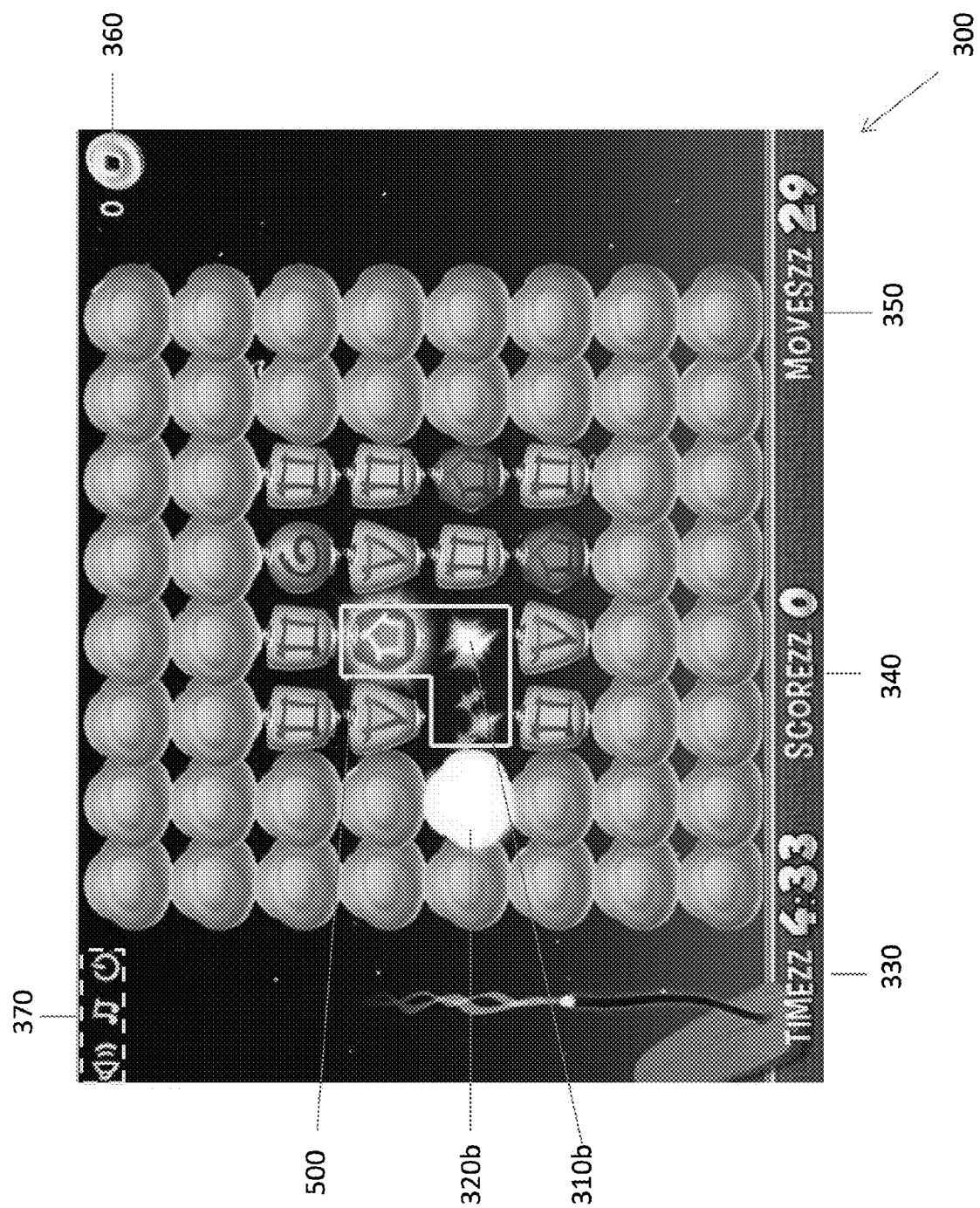
FIG. 5 illustrates the game board of FIG. 4 subsequent to the cessation of touch input, with the selected first game objects being removed.

FIG. 5 shows the game board 300 of FIG. 4 immediately after the selection of the group of three neighbouring first game objects 310*b* having at least one same characteristic. The successful selection of matching neighbouring first game objects 310*b* results in the removal, in some embodiments of the selected first game objects 310*b*, and also causes a state change in a neighbouring second game object 320*a* to for example a different display state in accordance with a stored third characteristic. In an embodiment the third characteristic may mandate different display colours of the second game object for each of the first 320*a* and second state 320*b*. FIG. 5 shows the neighbouring second game object 320*b* transformed into its second state.

In some embodiments, the second game objects are first transformed from a first state to a second state when activated, and subsequently only removed to for example reveal a first game object 310*a* when both first and second state have been activated. Hence, a second game object with a two-step or three-step characteristic for elimination is provided, thereby bringing an extra challenge and elements of strategic gameplay into the consideration of the user.

Figure 6:
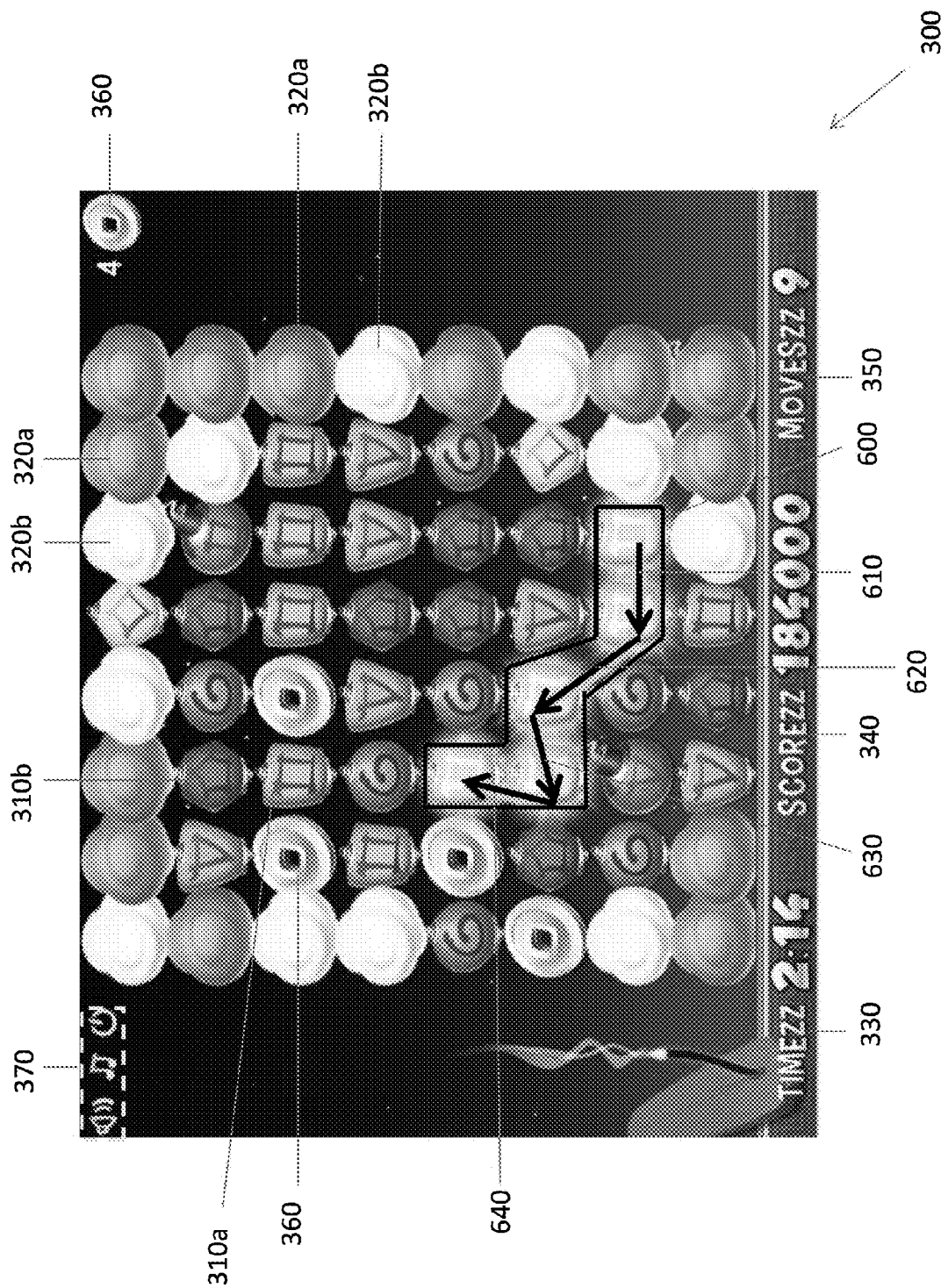
FIG. 6 illustrates a touch input trajectory according to some embodiments.

FIG. 6 illustrates a game board 300 in which a user input trajectory 600 spanning a selection sequence comprising five matching first game objects is shown. The sequence comprises portions of input as indicated by arrows 610, 620, 630 and 640 in this example. Other sequences and associated trajectories having different portions may also be detected in response to a selection of at least five or more neighbouring first game objects.

The selection of five or more neighbouring first game objects generates a further game object with behavioural characteristics and a movement vector dependent at least in part on a proportion of the input trajectory, as will now be described in more detail with reference to FIGS. 7*a*, 7*b*, 7*c*, 7*d*, and 7*e*.

Figure 7A:
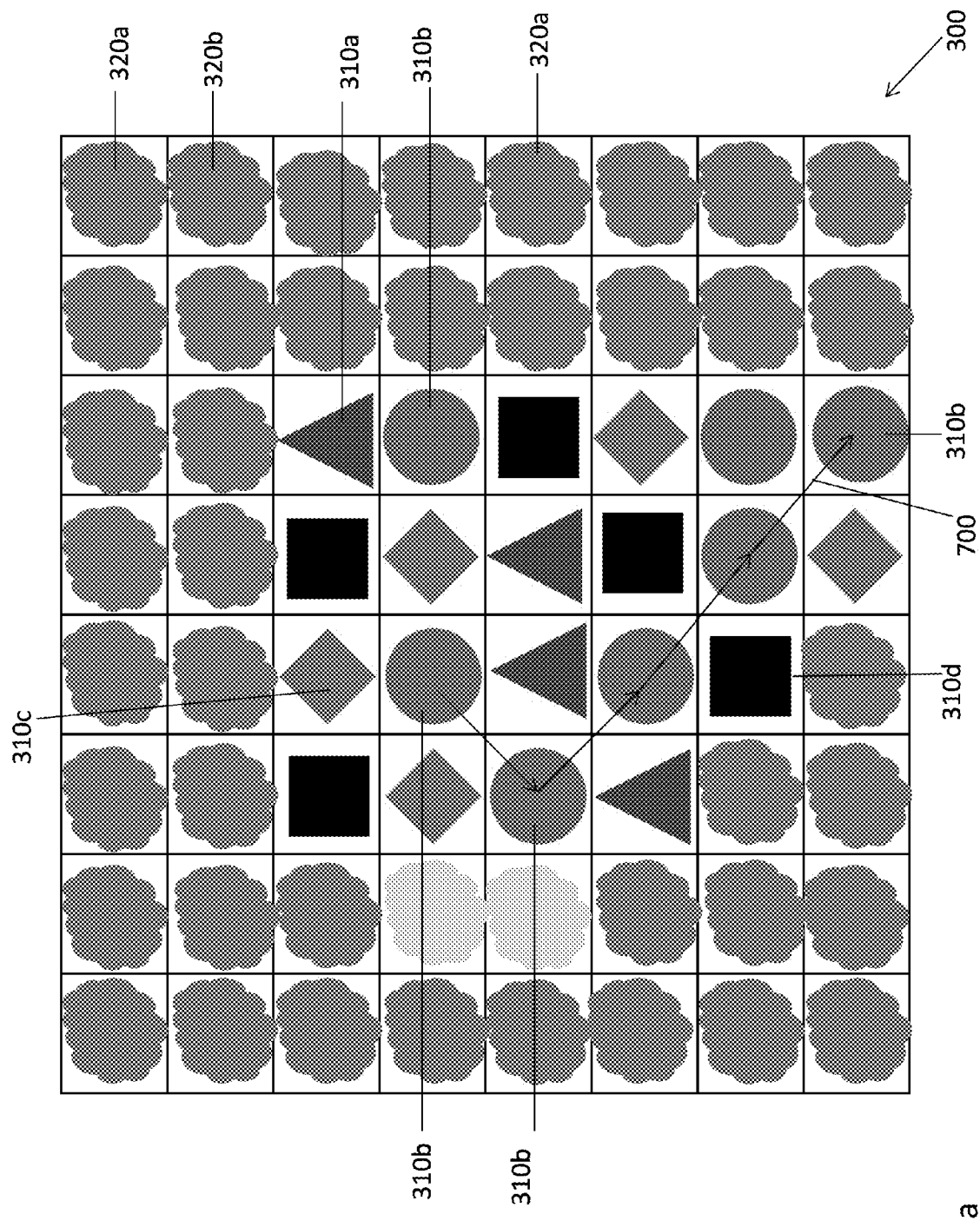
FIG. 7a indicates an example selection sequence and corresponding input trajectory according to some embodiments.

FIG. 7*a* shows an example game board 300 simplified for reasons of exposition. Those skilled in the art will realise that more complex graphical game boards are possible, and that the depiction in FIGS. 7*a*, 7*b*, 7*c*, 7*d*, and 7*e* is stylised for reasons of clarity only.

The game board 300 in FIG. 7*a* illustrates first game objects 310*a*, 310*b*, 310*c*, 310*d* having a differing characteristic. For simplicity, this characteristic is shown as a "shape" in FIG. 7*a*, i.e. object 310*a* is triangular, object 310*b* is circular, object 310*c* is diamond shaped and object 310*d* is rectangular.

FIG. 7*a* shows an input trajectory 700 comprising a selection of an input sequence of one or more neighbouring first game objects 310*b* sharing at least one same characteristic (circular) in response to user input. The sequence in the Figure comprises five first game objects 310*b*.

Figure 7B:
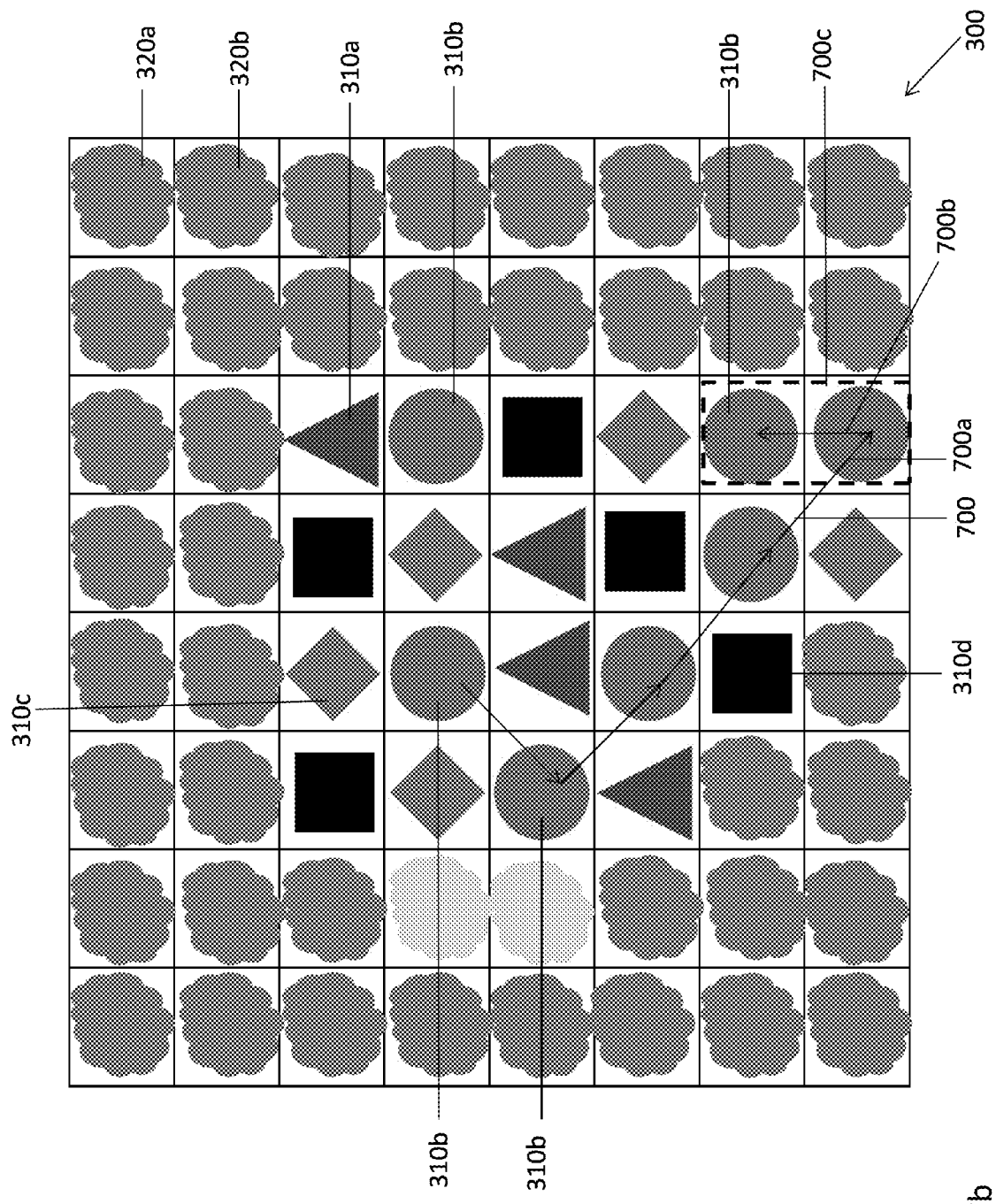
FIG. 7b shows an example of a determined target direction according to some embodiments.

FIG. 7*b* illustrates the sequence 700*a* being extended, by the user input, to a sixth first game object 310*b*. The extension of input 700*c* comprises an end portion 700*c* of the input trajectory 700. The end portion defines a target direction 700*b* (in the direction of the arrow 700*b*) associated with a movement vector of a further game object. The further game object may be generated on the selection of the sequence of first game objects 310*b* and subsequent determination of the target direction 700*b*.

Figure 7C:
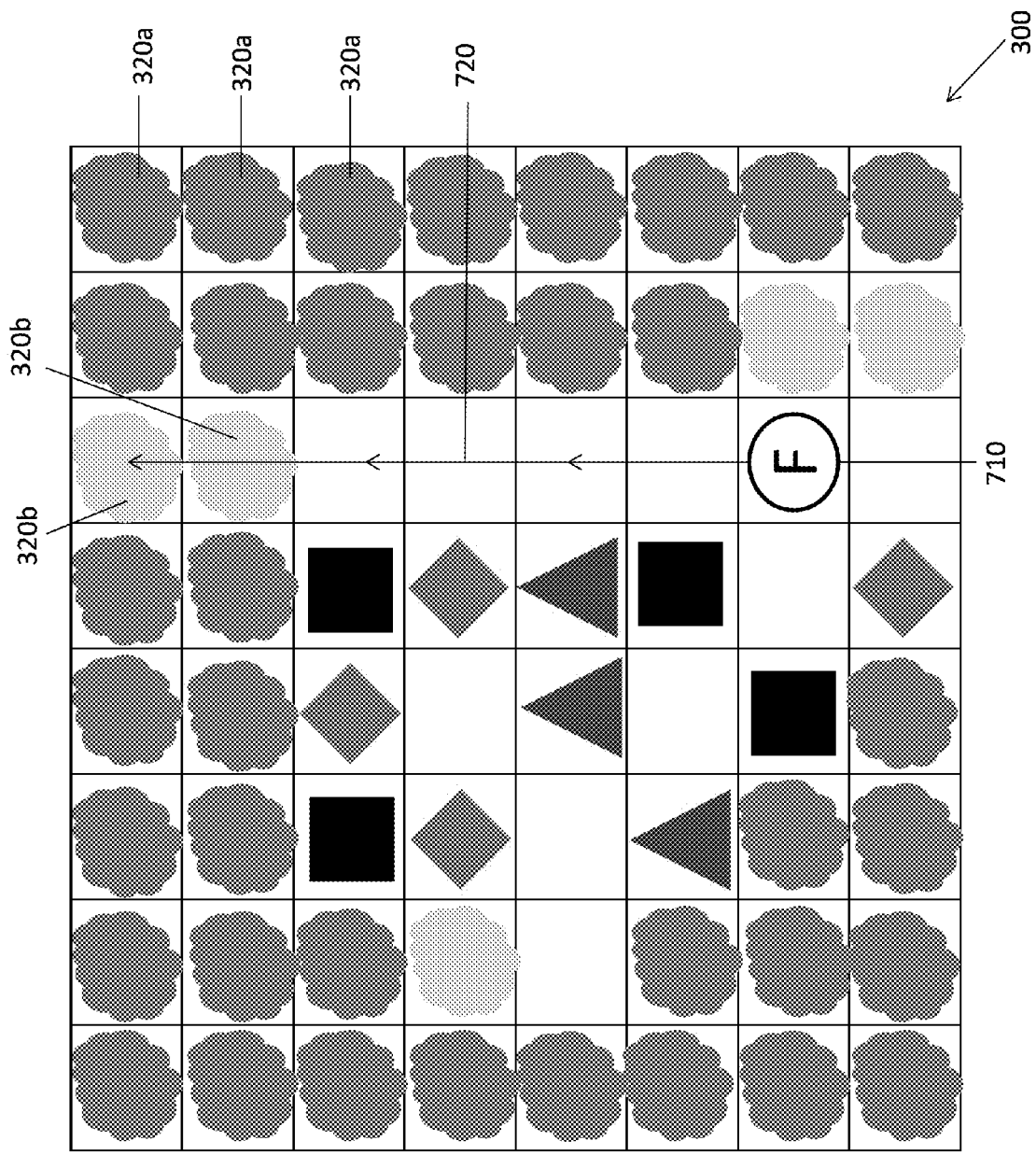
FIG. 7c depicts the generation of a further object and a movement vector according to some embodiments.

FIG. 7*c* illustrates the generation of a further game object "F" 710 after the detection of the input trajectory 700. The further game object 710, which may in some embodiments be a graphical representation of a dragon, may be generated at the game object position comprising the end of the input trajectory 700, 700*a*, 700*b*.

Upon generation, the processor 115, 220, proceeds to displace the further game object 710 in accordance with the movement vector comprising the determined target direction. Hence, in the example shown, the further game object 710 proceeds in a vertical direction 720 in accordance with the target direction 700b as shown to the boundary of the gameboard, and removes first game objects occupying the game object positions coinciding with the movement vector. First game objects 310b occupying the original input sequence may also be removed or eliminated upon creation of the further game object, as shown in FIG. 7d.

In another embodiment, the further game object 710 may remove first game objects 310b and convert or transform second game objects 320a from their first state 320a to their second state characteristic 320b.

A second game object in a second state 320b in the path of the further game object 710 as determined by the target direction 700b may be removed to reveal a first game object.

Figure 7D:
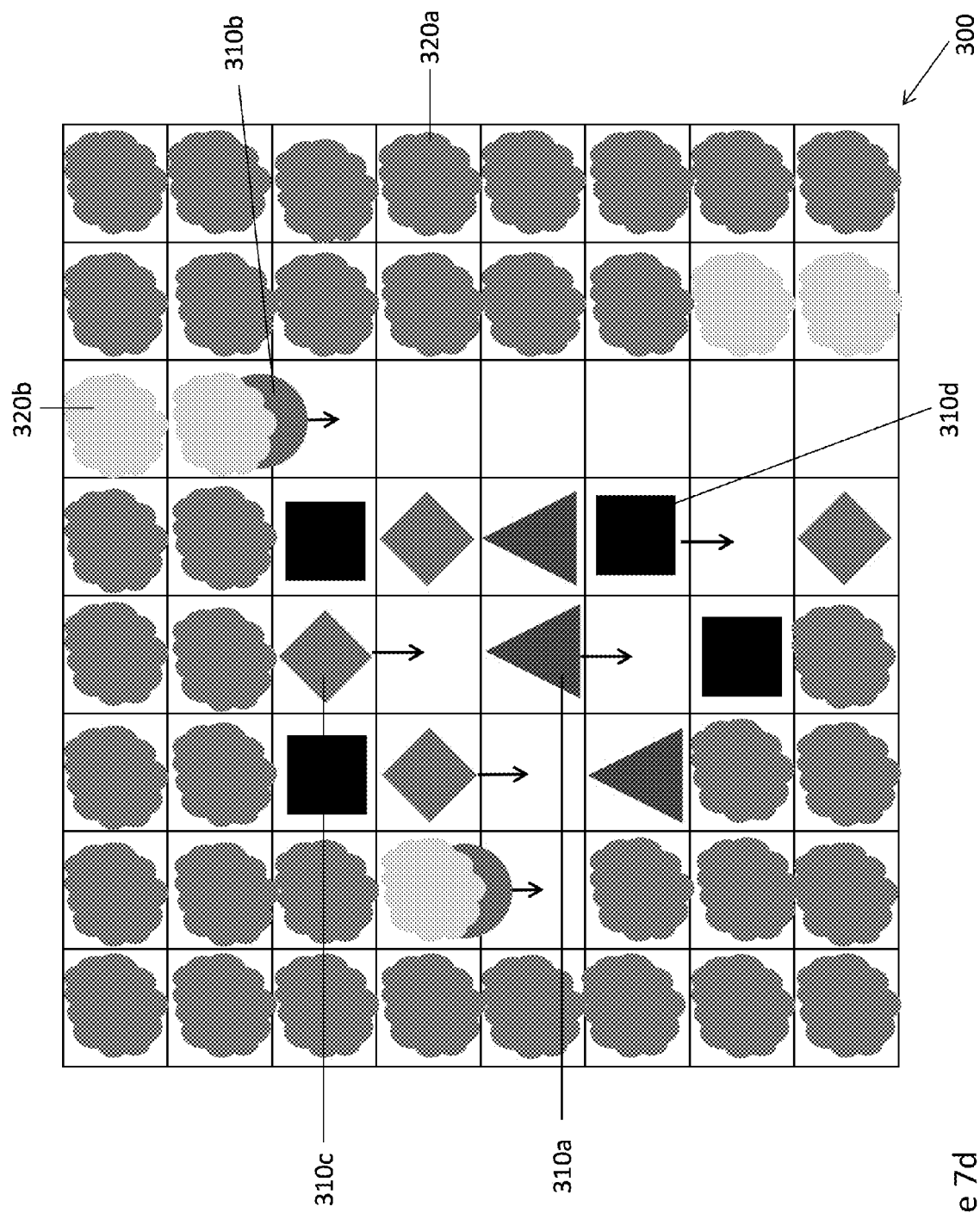
FIG. 7d illustrates a "refill" mode of the board of FIG. 7c according to some embodiments.

This is illustrated in FIG. 7d wherein the second game object exhibiting its second state characteristic 320b is removed to reveal a first game object 310b, which then "descends" down the game board to fill vacant game board positions created by the further game object 710.

Figure 7E:
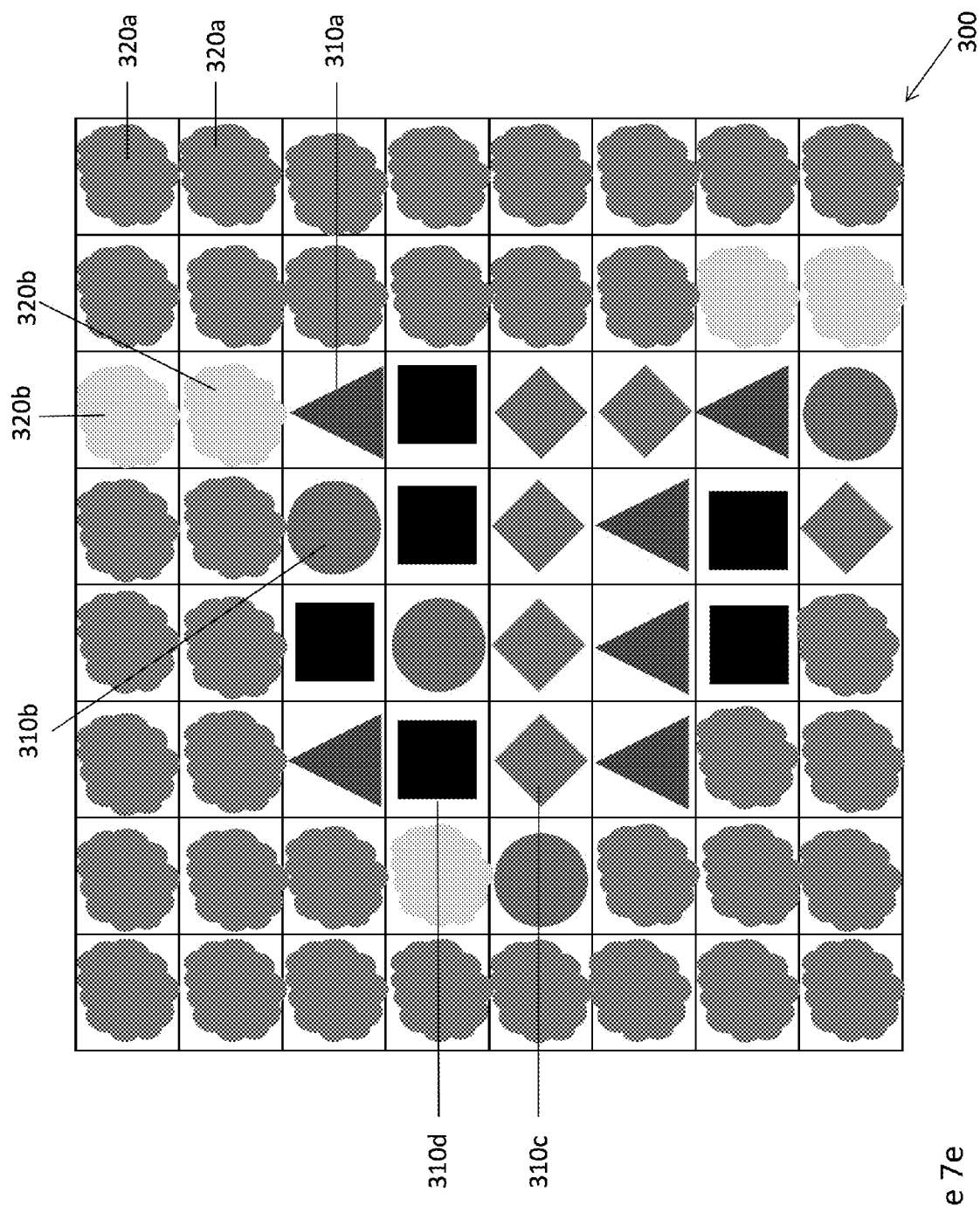
FIG. 7e illustrates the board of FIG. 7d after "refill" according to some embodiments.

FIG. 7e illustrates the game board 300 of FIGS. 7a-7d after the selection of a sequence, the generation of the further game object 710, and the subsequent behaviour of the further game object 710.

Hence a mechanic is provided which effectively entices the user to select long sequences of first game objects to create a further game object with a bonus behaviour, such as "line blasting" the first game objects in a direction determined by a portion of the input trajectory.

Figure 8:
FIG. 8 illustrates a game screen indicating a further game object and rules to invoke said further game object according to some embodiments.

FIG. 8 illustrates a notification message 800 to the user educating the user on how to create a further game object 710. In this embodiment, the user is notified that a sequence of 6 or more first game objects ("lanterns") are required to generate a further game object that has line blaster behaviour, and in particular can remove game objects 360 that are not removable by selection unlike first game objects 310a.

Figure 9:
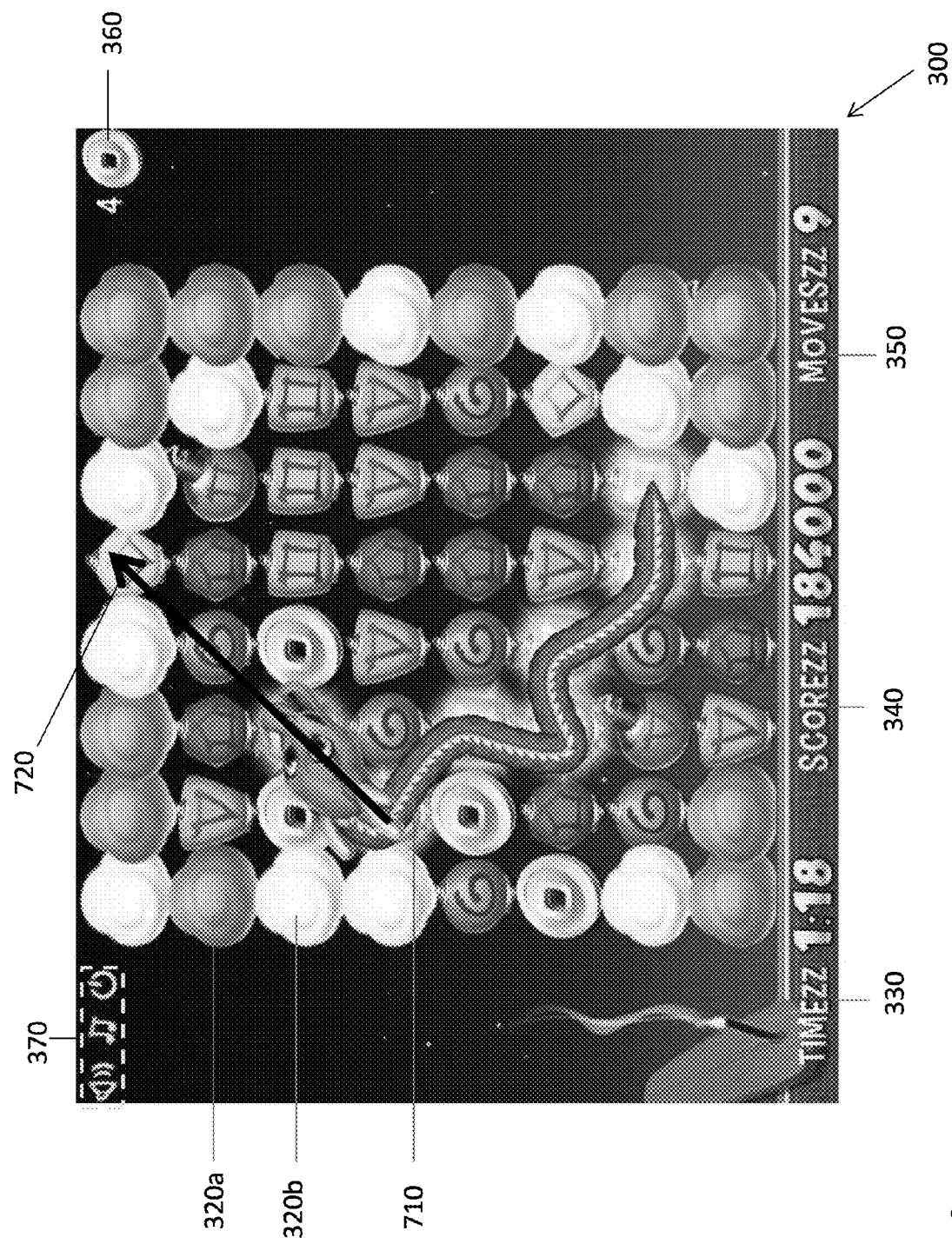
FIG. 9 illustrates a sequence of seven first game objects generating a further game object with a movement vector according to some embodiments.

FIG. 9 illustrates a game board 300 according to an embodiment showing a selection of a sequence of seven matching first game objects, the generation of the further object 710 extending throughout the selection sequence, and the determined direction 720 for the subsequent line blast behaviour.

Figure 10:
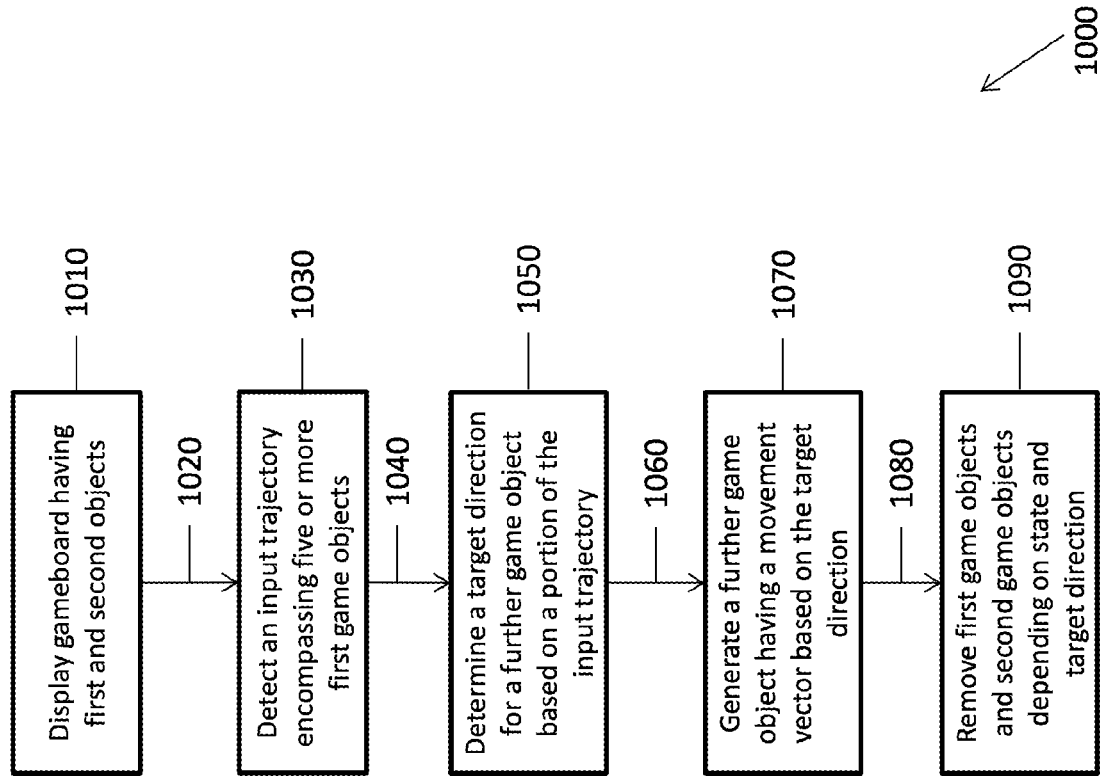
FIG. 10 is a flowchart depicting steps of a method according to an embodiment.

FIG. 10 illustrates a flow chart of steps taken by at least one processor 115, 220 according to an embodiment.

At step 1010 the processor 115, 220 causes a game board 300 comprising first game objects 310a, 310b, 310c, 310d and second game objects 320a, 320b to be displayed 155 on the user interface. The processor then proceeds via path 1020 to step 1030 wherein the user interface 155, 165 is monitored to detect a sequence comprising five or more matching and neighbouring first game objects 310b.

When such detection is made, the processor flows via pathway 1040 to step 1050 wherein a target direction 700b is determined for a further game object 710 based on a portion of the input trajectory 700.

The processor then proceeds via path 1060 to step 1070 wherein a movement vector based on the target direction 700b and input sequence 700 is created and associated with a generation of a further game object 710.

The processor then proceeds via path 1080 to step 1090 wherein the further game object subsequently removes the first game objects covered by the sequence and those first game objects lying in the path of the determined target direction, extending outwards to the boundary of the game board 300 and further causing removal or state change of any second game objects lying in said path of said movement vector.

In some embodiments, the game may be implemented so that a level or a game session is completed when all of the game objects or just certain designated game objects 310a, 310b, 310c, 310d, 320a, 320b on the game board 300 have been cleared or eliminated.

The user or player may in some embodiments be rewarded for good gameplay. For instance a series of consecutive selections of grouped neighbouring game objects may increase a bonus multiplier, whilst generation of a further game object 710, or more than one further game object 710 may also provide bonus points or extra lives or a booster or other special game elements.

The game board 300 may have a number of game objects having different characteristics aligned in rows and columns, such as a 7×8 grid. Other grid sizes may be suitable. The game objects on the game board may have six (or any other suitable number of) contact points with other neighbouring or adjacent game objects.

Other game board layouts or configurations may be provided. For example, pyramidal, hexagonal, octagonal or other layouts comprising position spaces or tiles within the game board 300 may be provided for display.

Some embodiments of the game may allow for the game to be synchronised between different devices or platforms.

The game can for instance be played in an offline mode on handheld device 100 using locally stored information on the handheld device 100. The device 100 may store all or some of the levels that are available for the player to play in the game. Some of the features in the game may be locally run on the device 100 and dependent on the local machine. This may for instance comprise the game being implemented to regenerate lives after a certain period of time, and the time may be locally determined based on the clock of the device 100. In some embodiments, the central game server clock may override the local clock when the local device 100 has been synchronised with the server 220.

Embodiments may comprise the game and further game object generation being monitored and synchronised with other game state information and connected to or provided to a social network and user profile of the user. Examples of such social networks comprise Facebook or Google+.

The device may also connect to a plurality of social networks. The user may be given the option to select what information is derived and/or shared with which social network according to user preferences.

Those skilled in the art will recognise that the predefined rules defining game object behaviour and characteristics, further game object creation, and game object behaviour in relation to further game objects, may be stored in the at least one memory 220 of user device 200 or server 320 or system 300, and the judicial technical consideration of such predetermined rules and game object behaviour as described hereinabove may provide an engaging and rewarding experience to the user.

Furthermore, various methods have been described. It should be appreciated that these methods will be implemented in apparatus, where the apparatus is implemented by any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes embodiments of the invention, there are several variations and modifications which may be made to the disclosed solution without departing from the scope of the present invention.

The invention claimed is:

1. A method of controlling a user interface responsive to user input with a displayed game board comprising a plurality of object positions on said user interface, the method comprising the following implemented by at least one processor of a device in communication with said user interface and at least one memory:
Displaying on said user interface a game board having a plurality of first and second game objects displayed on said game board positions, each first and second object having one or more characteristics stored in said at least one memory, the second game objects having a third characteristic,
detecting a user input trajectory on said user interface comprising a selection of a sequence of one or more neighbouring first game objects sharing at least one same characteristic in response to user input,
determining a target direction comprising a portion of said input trajectory with respect to the game board, wherein said target direction is determined at least in part on the relation of each of the last two neighboring objects' positions with respect to the game board; and
generating and displaying on said user interface a further game object having a movement vector comprising said target direction in dependence on said portion of said input trajectory, the target direction extending to a boundary of the displayed game board; and
displacing said further game object displayed on said user interface on said game board in accordance with said movement vector.

2. A method according to claim 1, wherein the selection of the sequence comprises five or more neighbouring first game objects sharing at least one same characteristic.

3. A method according to claim 1, wherein the selection of the sequence comprises six or more neighbouring first game objects sharing at least one same characteristic.

4. A method according to claim 1, wherein the input trajectory comprises a successive input sequence in relation to said game board and neighbouring object positions, and the portion of said input trajectory comprises at least the last two neighbouring objects selected in the sequence.

5. A method according to claim 1, wherein the generation of the further game object comprises providing said movement vector of said further game object with the determined target direction.

6. A method according to claim 1, wherein the displacement of said further game object comprises removing said first game objects from object positions on said game board coinciding with said movement vector of said further object.

7. A method according to claim 1, wherein the third characteristic of said second game object comprises a first state and a second state.

8. A method according to claim 7, wherein the second game object is displayed in said first state until activated, after which the second game object is displayed in said second state.

9. A method according to claim 8, wherein the displacement of said further game object comprises removing said second game objects in said second state from object positions on said game board coinciding with said movement vector of said further object.

10. A method according to claim 9, wherein the displacement of said further game object comprises detecting second game object positions on said game board coinciding with said movement vector of said further object, and configuring said second game objects in said first state to said second state based on said movement vector coinciding with said second object positions.

11. A device having a user interface comprising a display for displaying a game board comprising a plurality of object positions on said user interface, the user interface capable of receiving user input, the user interface displaying on said game board at said plurality of object positions a plurality of first and second game objects displayed on said game board positions, each first and second object having one or more characteristics stored in at least one memory, the second game objects having a third stored characteristic, and at least one processor configured to:
detect an input trajectory from said user input on said user interface comprising a selection of a sequence of one or more neighbouring first game objects sharing at least one same characteristic in response to said user input,
determine a target direction comprising a portion of said input trajectory with respect to the game board, wherein said target direction is determined by said at least one processor at least in part on the relation of each of the last two neighboring objects' positions selected in the input sequence with respect to the game board stored in said memory;
generate and display on said user interface a further game object having a movement vector comprising said target direction in dependence on said portion of said input trajectory, the target direction extending to a boundary of the displayed game board; and
display said further game object on said user interface on said game board in accordance with said movement vector.

12. A device according to claim 11, wherein the detected input selection sequence comprises five or more neighbouring first game objects sharing at least one same characteristic.

13. A device according to claim 11, wherein the detected input selection sequence comprises six or more neighbouring first game objects sharing at least one same characteristic.

14. A device according to claim 11, wherein the at least one processor determines the portion of said input trajectory comprising at least the last two objects selected in the sequence.

15. A device according to claim 11, wherein the at least one processor generates the further game object for display, and associates the movement vector of said further game object with the determined target direction.

16. A device according to claim 11, wherein the at least one memory stores one or more characteristics of first game objects and second game objects, and a third characteristic associated with the second game objects for generation and display of said first or second game objects on said game board by said processor.

17. A device according to claim 16, wherein the stored third characteristic associated with the second game objects comprises collision behaviour having at least two states, with a first collision invoking the second game object to transform to said second state, and a second collision invoking the second game object in said second state to be removed or eliminated.

18. A computer-readable non-transitory storage medium carrying one or more sequences of instructions which when executed by at least one processor, causes said processor to perform the following steps to a user interface:
- display on said user interface, a game board having a plurality of first and second game objects displayed on said game board positions, each first and second object having one or more characteristics stored in said at least one memory, the second game objects having a third characteristic,
- detect a user input trajectory on said user interface comprising a selection of a sequence of one or more neighbouring first game objects sharing at least one same characteristic in response to user input,
- determine a target direction comprising a portion of said input trajectory with respect to the game board, wherein said target direction is determined by said at least one processor at least in part on the relation of each of the last two neighboring objects' positions selected in the input sequence with respect to the game board stored in said memory;
- generate and display on said user interface a further game object having a movement vector comprising said target direction in dependence on said portion of said input trajectory, the target direction extending to a boundary of the displayed game board; and
- displace said further game object displayed on said user interface on said game board in accordance with said movement vector.

* * * * *